United States Patent
Gao

(10) Patent No.: US 9,774,403 B2
(45) Date of Patent: Sep. 26, 2017

(54) POWER SUPPLY CIRCUIT AND POWER SUPPLY PANEL

(71) Applicant: HUAWEI TECHNOLOGIES CO., LTD., Shenzhen (CN)

(72) Inventor: Xingguo Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 253 days.

(21) Appl. No.: 14/842,932

(22) Filed: Sep. 2, 2015

(65) Prior Publication Data
US 2015/0381288 A1 Dec. 31, 2015

Related U.S. Application Data

(63) Continuation of application No. PCT/CN2013/072241, filed on Mar. 6, 2013.

(51) Int. Cl.
*H04B 10/80* (2013.01)
*H04L 12/10* (2006.01)
*H04L 12/40* (2006.01)

(52) U.S. Cl.
CPC ........... *H04B 10/807* (2013.01); *H04L 12/10* (2013.01); *H04L 12/40045* (2013.01)

(58) Field of Classification Search
CPC .............................. H04B 10/80; H04B 10/806
See application file for complete search history.

(56) References Cited

U.S. PATENT DOCUMENTS 8,890,372 B2 * 11/2014 Garb ................. H01R 13/6675
307/140
8,981,601 B2 * 3/2015 Hatier ................ H02J 13/0055
307/140
(Continued)

FOREIGN PATENT DOCUMENTS

CN 2687968 3/2005
CN 1859537 11/2006
(Continued)

OTHER PUBLICATIONS

International Search Report dated Sep. 19, 2013, in corresponding International Application No. PCT/CN2013/072241.
(Continued)

*Primary Examiner* — Hai L Nguyen
(74) *Attorney, Agent, or Firm* — Staas & Halsey LLP

(57) ABSTRACT

Embodiments of the present invention provide a power supply circuit and panel. The power supply circuit includes: a power supply module (10), a switch module (20), which is separately connected to the power supply module (10), a terminal device, and the distribution point, and is connected to the distribution point and the terminal device when the distribution point does not need to be supplied with power, and is connected to the power supply module (10) and the distribution point when the distribution point needs to be supplied with power; a control module (30), an isolation module (40) and a service backhaul module (50), which is separately connected to the isolation module (40) and the terminal device, and outputs the external service to the terminal device when the distribution point needs to be supplied with power. The embodiments of the present invention further provide a power supply panel.

10 Claims, 3 Drawing Sheets

(56) References Cited

U.S. PATENT DOCUMENTS

| | | | |
|---|---|---|---|
| 2008/0043947 A1 | 2/2008 | Pan et al. |
| 2008/0122586 A1 | 5/2008 | Qin et al. |
| 2010/0061523 A1 | 3/2010 | Bund et al. |
| 2010/0150556 A1 | 6/2010 | Soto et al. |

FOREIGN PATENT DOCUMENTS

| | | |
|---|---|---|
| CN | 201114083 | 9/2008 |
| CN | 102170358 | 8/2011 |
| CN | 102571502 | 7/2012 |
| EP | 2362626 A1 | 8/2011 |

OTHER PUBLICATIONS

Extended European Search Report dated Feb. 18, 2016 in corresponding European Patent Application No. 13876940.1.

"Access, Terminals, Transmission and Multiplexing (ATTM): European Requirements for Reverse Powering of Remote access Equipment Part 1 Architecture", European Telecommunications Standards Institute, 2010, pp. 1-21.

PCT Internationa Search Report dated Sep. 19, 2013 in corresponding International Patent Application No. PCT/CN2013/072241.

\* cited by examiner

POWER SUPPLY CIRCUIT AND POWER SUPPLY PANEL

CROSS-REFERENCE TO RELATED APPLICATIONS

This application is a continuation of International Application No. PCT/CN2013/072241, filed on Mar. 6, 2013, which is hereby incorporated by reference in its entirety.

TECHNICAL FIELD

The present invention relates to the field of communications technologies, and in particular, to a power supply circuit and a power supply panel.

BACKGROUND

In a fiber to the distribution point (FTTdp for short) network, because it is difficult to feed power for a distribution point (DP for short) locally, how to supply power to the DP becomes a technical difficulty that needs to be solved in the FTTdp network.

In the prior art, power is supplied from internal power supply equipment (PSE for short) of a user home to an external DP of the user home, where a twisted pair is generally used as a medium for transmitting the supplied power. In such a power supply circuit, internal twisted pairs of a traditional user home are generally connected in series. If a power supply module is connected to a point on an internal line of the user home to reversely supply power to a DP, a voltage output by the power supply module not only is transmitted to the DP, but also is transmitted to other internal line interfaces of the user home. However, the other interfaces are generally connected to terminal devices such as an ordinary telephone set and modems of various digital subscriber lines. If the reverse voltage of this power supply module is transmitted to the terminal devices and no protective measure is taken by a user, some terminal devices may be burned out. Referring to FIG. 1, FIG. 1 is a schematic circuit diagram of supplying power to a DP in the prior art. In an internal cabling environment of a home, a first terminal device 100 and a second terminal device 200 are connected to a twisted pair. When a DP in an FTTdp network needs to be supplied with power, the DP is connected to the twisted pair, and a power supply module 300 is added so that the DP is conducted with the power supply module 300 through the twisted pair, thereby implementing reverse power supply for the DP. However, in addition to reversely supplying power to the DP, the power supply module 300 also transmits a reverse voltage to the first terminal device 100 and the second terminal device 200. Because the additional reverse voltage is introduced by the power supply module 300, there is a risk that the first terminal device 100 and the second terminal device 200 that are connected to the twisted pair may be burned out.

SUMMARY

Embodiments of the present invention provide a power supply circuit and a power supply panel, which can adaptively switch a power supply line according to whether power needs to be supplied to a distribution point, thereby ensuring normal and safe use of another terminal device in the circuit.

A first aspect of the embodiments of the present invention provides a power supply circuit, which is configured to supply power from an internal line of a user home to an external distribution point of the user home, and may include:

a power supply module, configured to supply power to the distribution point;

a switch module, separately connected to the power supply module, the distribution point, and an internal terminal device of the user home, where when the distribution point does not need to be supplied with power, the switch module is connected to only the distribution point and the terminal device, and when the distribution point needs to be supplied with power, the switch module is connected to only the power supply module and the distribution point;

a control module, connected to the power supply module, and configured to control, according to an electrical signal output by the power supply module, the switch module to perform line switching;

an isolation module, separately connected to the power supply module and the switch module, and configured to prevent a service provided by the distribution point from being output to the power supply module and prevent a voltage provided by the power supply module from being output to the terminal device; and a service backhaul module, separately connected to the isolation module and the terminal device, and configured to: when the distribution point needs to be supplied with power, output the service provided by the distribution point to the terminal device.

In a first possible implementation manner, the power supply circuit may further include:

a protection module, connected between the distribution point and the switch module, and configured to protect the switch module and the terminal device.

With reference to the first aspect or the first possible implementation manner of the first aspect, in a second possible implementation manner, the service backhaul module may be further configured to process the service provided by the distribution point and output the service to the terminal device.

With reference to the first aspect or the first or second possible implementation manner of the first aspect, in a third possible implementation manner, the switch module may include:

a single-pole double-throw switch, connected to the control module, and configured to receive a control signal of the control module and perform line switching.

A second aspect of the embodiments of the present invention provides a power supply panel, which is configured to supply power from an internal line of a user home to an external distribution point of the user home, and may include:

an external cable interface, configured to connect to the distribution point;

an internal cable interface, configured to connect to various terminal devices;

a reverse power supply interface, configured to connect to an external power supply module;

a switch module, configured to: connect to only the external cable interface and the internal cable interface when no power needs to be supplied to the distribution point, and connect to only the external cable interface and the reverse power supply interface when power needs to be supplied to the distribution point; and a service backhaul interface, configured to: when power needs to be supplied to the distribution point, connect to the external cable interface and the internal cable interface by using the reverse power supply interface.

In a first possible implementation manner, the power supply panel may further include:

a control module, separately connected to the reverse power supply interface and the switch module, and configured to control, according to an electrical signal output by the external power supply module, the switch module to perform line switching.

In a second possible implementation manner, the power supply panel may further include:

a switch control interface, connected to the switch module, and configured to connect to an external control module, to control the switch module to perform line switching.

With reference to the second aspect or the first or second possible implementation manner of the second aspect, in a third possible implementation manner, the switch module may include:

a single-pole double-throw switch, connected to the control module, and configured to receive a control signal of the control module and perform line switching.

With reference to the second aspect or the first or second or third possible implementation manner of the second aspect, in a fourth possible implementation manner, the power supply panel may further include:

a service processing module, separately connected to the service backhaul interface and the external power supply module, and configured to process a service provided by the distribution point and output the service to the various terminal devices by using the service backhaul interface.

With reference to the second aspect or the first or second or third or fourth possible implementation manner of the second aspect, in a fifth possible implementation manner, the power supply panel may further include:

a protection module, separately connected to the external cable interface and the switch module, and configured to protect the switch module and the various terminal devices connected to the internal cable interface.

The implementation of the embodiments of the present invention has the following beneficial effects:

Automatic switching of the power supply circuit can be implemented by configuring the switch module, the control module, the isolation module, and the service backhaul module. When an external distribution point of a user home needs to be supplied with power, the power supply module supplies power to only the distribution point, and no additional reverse voltage is output to an internal terminal device of the user home, thereby ensuring normal and safe use of the terminal device; when the distribution point does not need to be supplied with power, the switch module connects an external cable and an internal cable together, so that use of a traditional service is not affected. By configuring the protection module, safe and stable use of the entire power supply circuit can be ensured, and safety problems such as a lightning strike can be prevented.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
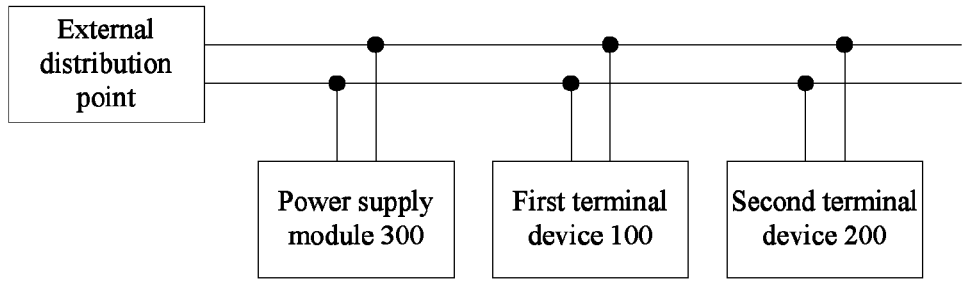
FIG. 1 is a schematic circuit diagram of supplying power to an external distribution point in the prior art.
Figure 2:
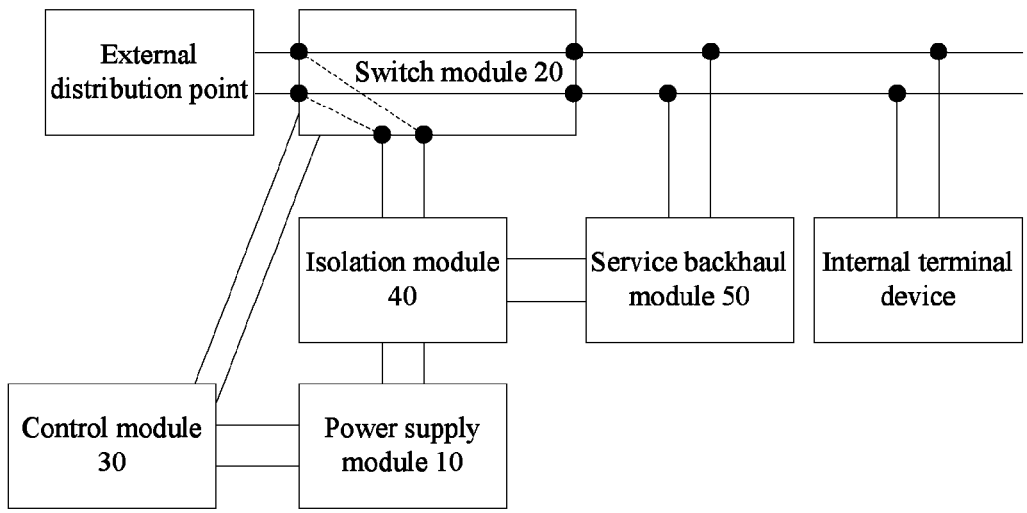
FIG. 2 is a schematic circuit diagram of a first embodiment of a power supply circuit according to the present invention.

Referring to FIG. 2, FIG. 2 is a schematic circuit diagram of a first embodiment of a power supply circuit according to the present invention. In this embodiment, the power supply circuit is configured to supply power from an internal line of a user home to an external distribution point of the user home, and includes: a power supply module 10, a switch module 20, a control module 30, an isolation module 40, and a service backhaul module 50.

The power supply module 10 is configured to supply power to the distribution point.

Specifically, the power supply module 10 can provide a stable reverse voltage to the external distribution point. When there is more than one external distribution point, a power supply capability of the power supply module 10 can be allocated properly. When a quantity of external distribution points exceeds a loading capability of a single power supply module 10, one more power supply module 10 may be configured.

The switch module 20 is separately connected to the power supply module 10, the distribution point, and an internal terminal device of the user home. When the distribution point does not need to be supplied with power, the switch module 20 is connected to only the distribution point and the terminal device, as shown by a solid line connection in FIG. 2; when the distribution point needs to be supplied with power, the switch module 20 is connected to only the power supply module 10 and the distribution point, as shown by a dashed line connection in FIG. 2.

Preferably, the switch module 20 may be a single-pole double-throw switch. When the distribution point does not need to be supplied with power, the single-pole double-throw switch is switched to an internal cable by default, to connect to the distribution point and various terminal devices such as an ordinary telephone set and a modem. In this way, a traditional service is not affected. When the distribution point needs to be supplied with power, the single-pole double-throw switch is switched from the internal cable to the power supply module 10, so as to connect to the power supply module 10 and the distribution point, thereby supplying power to the distribution point.

It should be noted that, a specific implementation manner of the switch module 20 is described in this embodiment, and a person skilled in the art should understand that any switch module that can perform line switching shall fall within the protection scope of the present invention. Line switching by using a single-pole double-throw switch has advantages of low costs, simple structure, and good effect.

The control module 30 is connected to the power supply module 10, and is configured to control, according to an electrical signal output by the power supply module 10, the switch module 20 to perform line switching.

When the external distribution point needs to be supplied with power, the control module 30 is connected to the power supply module 10, and controls, according to a voltage or a current signal provided by the power supply module 10, the switch module 20 to switch from a default position to being connected to the power supply module 10, thereby achieving automatic control.

Certainly, in addition to performing automatic switching by using the control module 30, manual switching may also be performed when the external distribution point needs to be supplied with power, which can also achieve objectives of switching a circuit, and protecting various internal terminal devices of the home.

The isolation module 40 is separately connected to the power supply module 10 and the switch module 20, and is configured to prevent a service provided by the distribution point from being output to the power supply module 10 and prevent a voltage provided by the power supply module 10 from being output to the terminal device.

The service backhaul module 50 is separately connected to the isolation module 40 and the terminal device, and is configured to: when the distribution point needs to be supplied with power, output the service provided by the distribution point to the terminal device.

Specifically, when the distribution point needs to be supplied with power, the switch module 20 is switched to being connected to the power supply module 10 and the distribution point. In this case, the terminal device cannot receive various services such as a voice service and a broadband service that are provided by the distribution point. By configuring the isolation module 40 and the service backhaul module 50, when the switch module 20 is connected to the power supply module 10 and the distribution point, the service backhaul module 50 connected between the power supply module 10 and the distribution point may connect an external cable and the internal cable, so that a service provided by the distribution point may be output to the terminal device by using the service backhaul module 50. In addition, due to the presence of the isolation module 40, a reverse voltage of the power supply module 10 is not transmitted to the terminal device through the isolation module 40, for example, an effect of allowing an alternating current to pass and blocking a direct current can be achieved by simply disposing a high-pass filter on a line, connected to the service backhaul module 50, inside the isolation module 40. Moreover, the isolation module 40 can also prevent the service provided by the distribution point from being transmitted to the power supply module 10 through the isolation module 40.

Automatic switching of the power supply circuit can be implemented by configuring the switch module 20, the control module 30, the isolation module 40, and the service backhaul module 50. When an external distribution point of a user home needs to be supplied with power, the power supply module supplies power to only the distribution point, and no additional reverse voltage is output to an internal terminal device of the user home, thereby ensuring normal and safe use of the terminal device; when the distribution point does not need to be supplied with power, the switch module connects an external cable and an internal cable together, so that use of a traditional service is not affected.

Figure 3:
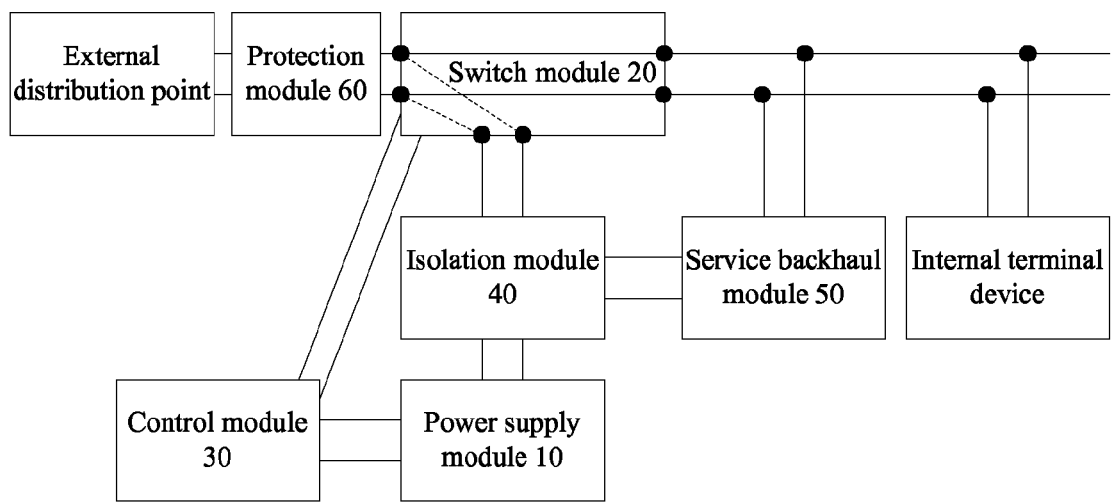
FIG. 3 is a schematic circuit diagram of a second embodiment of a power supply circuit according to the present invention.

Referring to FIG. 3, FIG. 3 is a schematic circuit diagram of a second embodiment of a power supply circuit according to the present invention. In this embodiment, the power supply circuit includes: a power supply module 10, a switch module 20, a control module 30, an isolation module 40, a service backhaul module 50, and a protection module 60.

The power supply module 10 is configured to supply power to a distribution point.

The switch module 20 is separately connected to the power supply module 10, the distribution point, and an internal terminal device of a user home. When the distribution point does not need to be supplied with power, the switch module 20 is connected to only the distribution point and the terminal device, and when the distribution point needs to be supplied with power, the switch module 20 is connected to only the power supply module 10 and the distribution point.

The control module 30 is connected to the power supply module 10, and is configured to control, according to an electrical signal output by the power supply module 10, the switch module 20 to perform line switching.

The isolation module 40 is separately connected to the power supply module 10 and the switch module 20, and is configured to prevent a service provided by the distribution point from being output to the power supply module 10 and prevent a voltage provided by the power supply module 10 from being output to the terminal device.

The service backhaul module 50 is separately connected to the isolation module 40 and the terminal device, and is configured to: when the distribution point needs to be supplied with power, output the service provided by the distribution point to the terminal device.

The protection module 60 is connected between the distribution point and the switch module 20, and is configured to protect the switch module 20 and the terminal device.

Specifically, because an external cable may suffer a lightning strike or other interference, by disposing the protection module 60 between the distribution point and the switch module 20, a good protection effect for the switch module 20 and various terminal devices at a back end can be provided, and therefore, the terminal devices can be prevented from being damaged when the distribution point or another external device is struck by lightning.

By disposing the protection module, safe and stable use of the entire power supply circuit can be ensured, and safety problems such as a lightning strike can be prevented.

Figure 4:
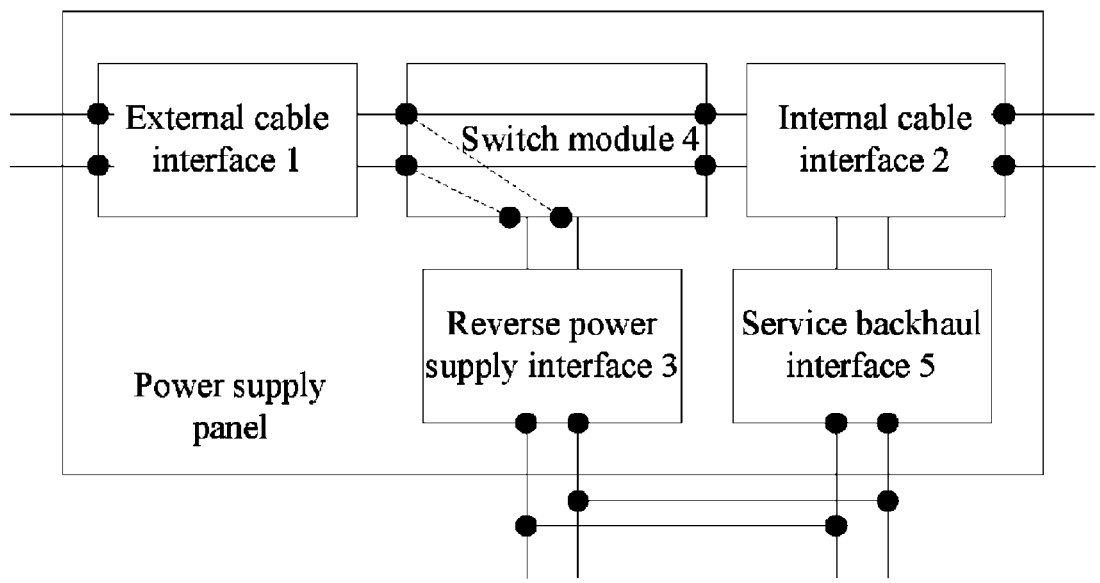
FIG. 4 is a schematic circuit diagram of a first embodiment of a power supply panel according to the present invention.

Referring to FIG. 4, FIG. 4 is a schematic composition diagram of a first embodiment of a power supply panel according to the present invention. In this embodiment, the power supply panel is configured to supply power from an internal line of a user home to an external distribution point of the user home, and includes: an external cable interface 1, an internal cable interface 2, a reverse power supply interface 3, a switch module 4, and a service backhaul interface 5.

The external cable interface 1 is configured to connect to the distribution point.

The internal cable interface 2 is configured to connect to various terminal devices, such as an ordinary telephone set and various modems. Certainly, a series of service interfaces may also be configured on the power supply panel, as long as it is ensured that one end of each of these service interfaces is connected to the internal cable interface 2. In this case, the terminal devices may also be directly connected to these service interfaces, making cabling of the panel neater.

The reverse power supply interface 3 is configured to connect to an external power supply module.

The switch module 4 is configured to: connect to only the external cable interface 1 and the internal cable interface 2 when no power needs to be supplied to the distribution point, and connect to only the external cable interface 1 and the reverse power supply interface 3 when power needs to be supplied to the distribution point.

Preferably, the switch module 4 may be a single-pole double-throw switch, which has advantages of simple structure, lost costs, and convenient switching.

Optionally, when the switch module 4 performs line switching, manual switching may be used, or a corresponding control module may be disposed to control the switch module 4 to perform switching automatically.

The service backhaul interface 5 is configured to: when power needs to be supplied to the distribution point, connect to the external cable interface 1 and the internal cable interface 2 by using the reverse power supply interface.

Specifically, when the switch module 4 is connected to only the external power supply module and the external cable interface 1, the service backhaul interface 5 outputs a service provided by the external cable interface 1 to the internal cable interface 2, and transmits the service to the various terminal devices by using the internal cable interface 2. In order to prevent the service provided by the external cable interface 1 from being output to the external power supply module, and prevent a reverse voltage provided by the external power supply module from being output to an internal terminal device by using the service backhaul interface 5, one isolation module may be disposed between the reverse power supply interface 3 and the external power supply module, to isolate a service signal and a voltage signal.

When there are many terminal devices that need to be connected, multiple extension panels may be configured, where all the multiple extension panels are connected to the internal cable interface 2, so as to implement modularization of the terminal devices and the interfaces, thereby avoiding disadvantages such as large volume of the power supply panel and messy cable layout caused because there are many terminal devices that need to be connected. A modular extension panel can be easily connected and is convenient to use.

By configuring the power supply panel provided with the switch module and the service backhaul interface, and in combination with the external power supply module and the isolation module, power can be safely and stably supplied to a distribution point in a case in which only a main panel of a home is changed, without a need to change various configurations of terminals of a user home, which helps a user keep a usage habit, and is convenient and safe.

Figure 5:
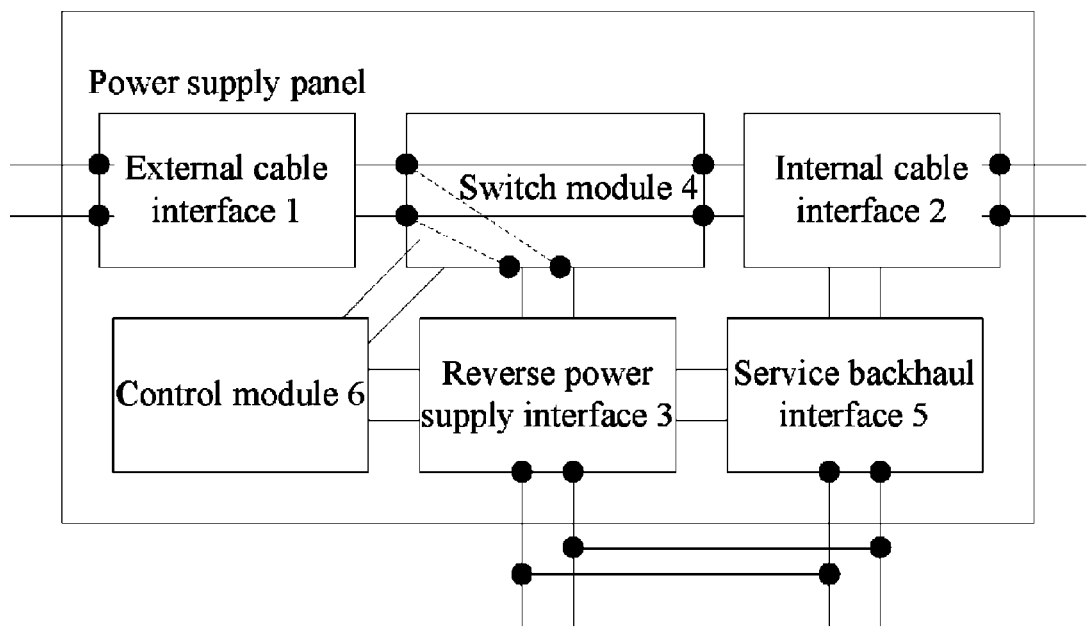
FIG. 5 is a schematic circuit diagram of a second embodiment of a power supply panel according to the present invention.

Referring to FIG. 5, FIG. 5 is a schematic composition diagram of a second embodiment of a power supply panel according to the present invention. In this embodiment, the power supply panel includes: an external cable interface 1, an internal cable interface 2, a reverse power supply interface 3, a switch module 4, a service backhaul interface 5, and a control module 6.

The external cable interface 1 is configured to connect to a distribution point.

The internal cable interface 2 is configured to connect to various terminal devices.

The reverse power supply interface 3 is configured to connect to an external power supply module.

The switch module 4 is configured to: connect to only the external cable interface 1 and the internal cable interface 2 when no power needs to be supplied to the distribution point, and connect to only the external cable interface 1 and the reverse power supply interface 3 when power needs to be supplied to the distribution point.

The service backhaul interface 5 is configured to: when power needs to be supplied to the distribution point, connect to the external cable interface 1 and the internal cable interface 2 by using the reverse power supply interface.

The control module 6 is separately connected to the reverse power supply interface 3 and the switch module 4, and configured to control, according to an electrical signal output by the external power supply module, the switch module 4 to perform line switching.

Preferably, the switch module 4 may include:

a single-pole double-throw switch, connected to the control module 6, and configured to receive a control signal of the control module 6 and perform line switching.

The control module 6 receives the electrical signal provided by the external power supply module from the reverse power supply interface 3, so as to control the switch module 4 to perform line switching. A switching process does not need a manual operation, and is completed automatically, so as to be easy to use, convenient, and quick.

Figure 6:
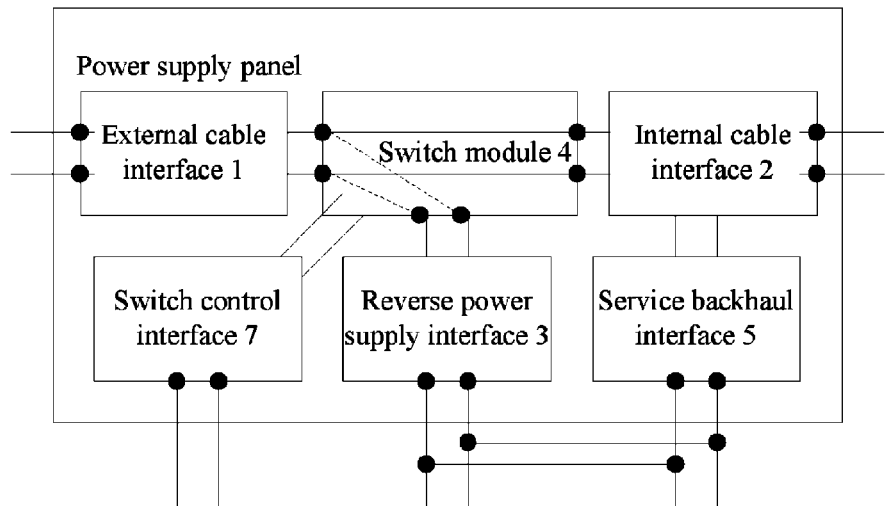
FIG. 6 is a schematic circuit diagram of a third embodiment of a power supply panel according to the present invention.

Referring to FIG. 6, FIG. 6 is a schematic composition diagram of a third embodiment of a power supply panel according to the present invention. In this embodiment, the power supply panel includes: an external cable interface 1, an internal cable interface 2, a reverse power supply interface 3, a switch module 4, a service backhaul interface 5, and a switch control interface 7.

The external cable interface 1 is configured to connect to a distribution point.

The internal cable interface 2 is configured to connect to various terminal devices.

The reverse power supply interface 3 is configured to connect to an external power supply module.

The switch module 4 is configured to: connect to only the external cable interface 1 and the internal cable interface 2 when no power needs to be supplied to the distribution point, and connect to only the external cable interface 1 and the reverse power supply interface 3 when power needs to be supplied to the distribution point.

The service backhaul interface 5 is configured to: when power needs to be supplied to the distribution point, connect to the external cable interface 1 and the internal cable interface 2 by using the reverse power supply interface 3.

The switch control interface 7 is connected to the switch module 4, and is configured to connect to an external control module, to control the switch module 4 to perform line switching. Specifically, the external control module may acquire a voltage signal or a current signal of the reverse power supply interface 3 as a trigger signal for control, thereby implementing automatic control of line switching.

It can be known from comparison with the foregoing embodiment that the control module may be integrated in the power supply panel, or may independently exist outside the power supply panel. When the control module independently exists outside the power supply panel, only a switch control interface needs to be reserved on the power supply panel, thereby reducing a volume of the power supply panel.

Figure 7:
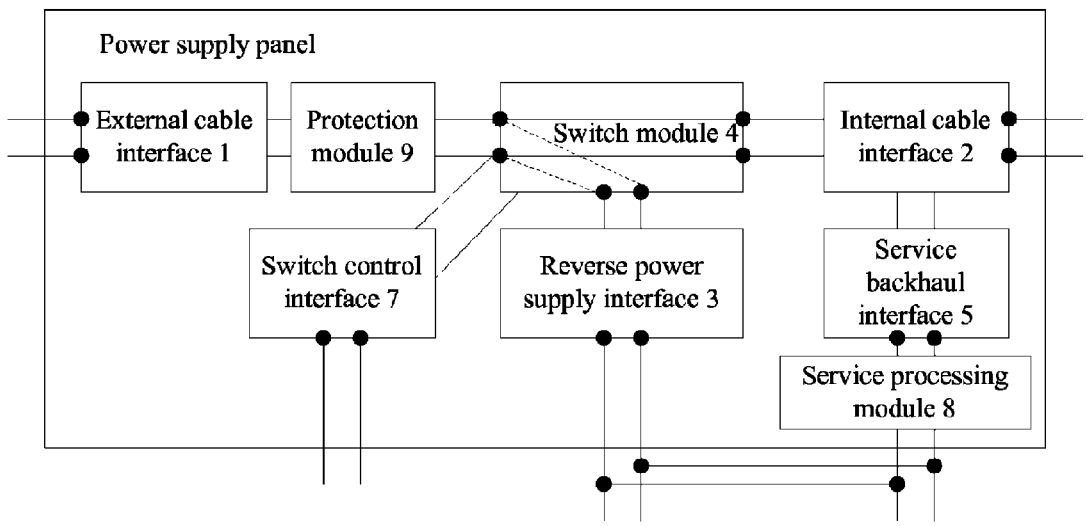
FIG. 7 is a schematic circuit diagram of a fourth embodiment of a power supply panel according to the present invention.

Referring to FIG. 7, FIG. 7 is a schematic composition diagram of a fourth embodiment of a power supply panel according to the present invention. The power supply panel includes an external cable interface 1, an internal cable interface 2, a reverse power supply interface 3, a switch module 4, a service backhaul interface 5, a switch control interface 7, a service processing module 8, and a protection module 9.

The external cable interface 1 is configured to connect to a distribution point.

The internal cable interface 2 is configured to connect to various terminal devices.

The reverse power supply interface 3 is configured to connect to an external power supply module.

The switch module 4 is configured to: connect to only the external cable interface 1 and the internal cable interface 2 when no power needs to be supplied to the distribution point, and connect to only the external cable interface 1 and the reverse power supply interface 3 when power needs to be supplied to the distribution point.

The service backhaul interface 5 is configured to: when power needs to be supplied to the distribution point, connect to the external cable interface 1 and the internal cable interface 2 by using the reverse power supply interface 3.

The switch control interface 7 is connected to the switch module 4, and is configured to connect to an external control module, to control the switch module 4 to perform line switching.

The service processing module 8 is separately connected to the service backhaul interface 5 and the external power supply module, and configured to process a service provided by the distribution point and output the service to the various terminal devices by using the service backhaul interface 5.

Specifically, the service processing module 8 may perform corresponding processing on a voice service, a broadband service, or the like that is transmitted from an external cable, and then transmit the service to the various terminal devices by using the service backhaul interface 5, so as to meet a corresponding need of a user.

The protection module 9 is separately connected to the external cable interface 1 and the switch module 4, and is configured to protect the switch module 4 and the various terminal devices connected to the internal cable interface 2.

Specifically, because the external cable may suffer a lightning strike or other interference, by disposing the protection module 9 between the external cable interface 1 and the switch module 4, a good protection effect for the switch module 4 and various terminal devices at a back end can be provided, thereby preventing the terminal devices from being damaged when the external cable or another external device is struck by lightning.

It should be noted that the embodiments in this specification are all described in a progressive manner. Description of each of the embodiments focuses on differences from other embodiments, and reference may be made to each other for the same or similar part among respective embodiments. For an apparatus embodiment, it is basically similar to a method embodiment, and therefore is described briefly; for related parts, reference may be made to partial descriptions in the method embodiment.

According to the description of the foregoing embodiments, the present invention has the following advantages:

Automatic switching of the power supply circuit can be implemented by configuring the switch module, the control module, the isolation module, and the service backhaul module. When an external distribution point of a user home needs to be supplied with power, the power supply module supplies power to only the distribution point, and no additional reverse voltage is output to an internal terminal device of the user home, thereby ensuring normal and safe use of the terminal device; when the distribution point does not need to be supplied with power, the switch module connects an external cable and an internal cable together, so that use of a traditional service is not affected. By configuring the protection module, safe and stable use of the entire power supply circuit can be ensured, and a safety problem such as a lightning strike can be prevented.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM for short), or a random access memory (RAM for short).

The power supply circuit and the power supply panel provided in the embodiments of the present invention are described in detail above. In this specification, specific examples are used to describe the principle and implementation manners of the present invention, and the description of the embodiments is only intended to help understand the method and core idea of the present invention. Meanwhile, a person of ordinary skill in the art may, based on the idea of the present invention, make modifications with respect to the specific implementation manners and the application scope. Therefore, the content of this specification shall not be construed as a limitation to the present invention.

What is claimed is:

1. A power supply circuit, configured to supply power from an internal line of a user home to an external distribution point of the user home, comprising:
   a power supply module, configured to supply power to the distribution point;
   a switch module, separately connected to the power supply module, the distribution point, and an internal terminal device of the user home, wherein when the distribution point does not need to be supplied with power, the switch module is connected to only the distribution point and the terminal device, and when the distribution point needs to be supplied with power, the switch module is connected to only the power supply module and the distribution point;
   a control module, connected to the power supply module, and configured to control, according to an electrical signal output by the power supply module, the switch module to perform line switching;
   an isolation module, separately connected to the power supply module and the switch module, and configured to prevent a service provided by the distribution point from being output to the power supply module and prevent a voltage provided by the power supply module from being output to the terminal device; and
   a service backhaul module, separately connected to the isolation module and the terminal device, and configured to: when the distribution point needs to be supplied with power, output the service provided by the distribution point to the terminal device.

2. The power supply circuit according to claim 1, wherein the power supply circuit further comprises:
   a protection module, connected between the distribution point and the switch module, and configured to protect the switch module and the terminal device.

3. The power supply circuit according to claim 1, wherein the service backhaul module is further configured to process the service provided by the distribution point and output the service to the terminal device.

4. The power supply circuit according to claim 1, wherein the switch module comprises:
   a single-pole double-throw switch, connected to the control module, and configured to receive a control signal of the control module and perform line switching.

5. A power supply panel, configured to supply power from an internal line of a user home to an external distribution point of the user home, comprising:
   an external cable interface, configured to connect to the distribution point;
   an internal cable interface, configured to connect to various terminal devices;
   a reverse power supply interface, configured to connect to an external power supply module;
   a switch module, configured to: connect to only the external cable interface and the internal cable interface when no power needs to be supplied to the distribution point, and connect to only the external cable interface and the reverse power supply interface when power needs to be supplied to the distribution point; and
   a service backhaul interface, configured to: when power needs to be supplied to the distribution point, connect to the external cable interface and the internal cable interface by using the reverse power supply interface.

6. The power supply panel according to claim 5, wherein the power supply panel further comprises:
   a control module, separately connected to the reverse power supply interface and the switch module, and configured to control, according to an electrical signal output by the external power supply module, the switch module to perform line switching.

7. The power supply panel according to claim 5, wherein the power supply panel further comprises:
   a switch control interface, connected to the switch module, and configured to connect to an external control module, to control the switch module to perform line switching.

8. The power supply panel according to claim 5, wherein the switch module comprises:
   a single-pole double-throw switch, connected to the control module, and configured to receive a control signal of the control module and perform line switching.

9. The power supply panel according to claim 6, wherein the power supply panel further comprises:
   a service processing module, separately connected to the service backhaul interface and the external power supply module, and configured to process a service provided by the distribution point and output the service to the various terminal devices by using the service backhaul interface.

10. The power supply panel according to claim 6, wherein the power supply panel further comprises:
    a protection module, separately connected to the external cable interface and the switch module, and configured to protect the switch module and the various terminal devices connected to the internal cable interface.

* * * * *